(12) United States Patent
Lee et al.

(10) Patent No.: US 10,317,590 B2
(45) Date of Patent: Jun. 11, 2019

(54) DISPLAY APPARATUS

(71) Applicant: SAMSUNG DISPLAY CO., LTD., Yongin, Gyeonggi-Do (KR)

(72) Inventors: Gyeongim Lee, Yongin (KR); Jangseok Ma, Yongin (KR); Namseok Baik, Yongin (KR); Junghee Son, Yongin (KR); Sangwoo An, Yongin (KR); Dukjin Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 338 days.

(21) Appl. No.: 14/641,112

(22) Filed: Mar. 6, 2015

(65) Prior Publication Data

US 2016/0077254 A1 Mar. 17, 2016

(30) Foreign Application Priority Data

Sep. 16, 2014 (KR) ........................ 10-2014-0122928

(51) Int. Cl.
*G02B 5/20* (2006.01)
*G02B 5/02* (2006.01)

(52) U.S. Cl.
CPC ........... *G02B 5/206* (2013.01); *G02B 5/0242* (2013.01); *G02B 5/0294* (2013.01)

(58) Field of Classification Search
CPC .... G02B 5/0236; G02B 5/0242; G02B 5/223; G02F 2001/1335–2001/133567; H04N 1/0289

See application file for complete search history.

(56) References Cited

U.S. PATENT DOCUMENTS

| | | | | |
|---|---|---|---|---|
| 5,085,973 A | * | 2/1992 | Shimizu | G02F 1/133516 349/106 |
| 5,633,739 A | * | 5/1997 | Matsuyama | B41M 5/265 349/106 |
| 6,368,757 B1 | * | 4/2002 | Choi | G02B 5/201 430/20 |
| 6,786,617 B2 | * | 9/2004 | Lemay | B60Q 3/14 257/E25.02 |
| 8,167,458 B2 | * | 5/2012 | Wingett | F21V 9/40 362/293 |
| 2007/0247565 A1 | * | 10/2007 | Sasaki | C09B 67/0022 349/70 |
| 2009/0195152 A1 | | 8/2009 | Sawano | |

(Continued)

FOREIGN PATENT DOCUMENTS

JP 2005-326586 A 11/2005
JP 2009-187804 A 8/2009

(Continued)

*Primary Examiner* — William R Alexander
*Assistant Examiner* — Jeffrey E Madonna
(74) *Attorney, Agent, or Firm* — Lewis Roca Rothgerber Christie LLP

(57) ABSTRACT

A display apparatus for displaying an image to a user includes: a display panel configured to generate visible light; and an optical functional layer including: a matrix mixed with a plurality of optical functional particles that are colored, wherein the optical functional layer is at a side of the display panel such that at least a part of the visible light from the display panel would pass through the optical functional layer.

20 Claims, 16 Drawing Sheets

(56) References Cited

U.S. PATENT DOCUMENTS

| | | | |
|---|---|---|---|
| 2011/0183066 A1* | 7/2011 | Helber | G02B 5/201 427/68 |
| 2011/0298361 A1 | 12/2011 | Matsunaga et al. | |
| 2013/0026461 A1 | 1/2013 | Nakamura | |
| 2013/0062654 A1 | 3/2013 | Taima et al. | |

FOREIGN PATENT DOCUMENTS

| JP | 2011-249686 A | 12/2011 |
|---|---|---|
| JP | 2012-123384 A | 6/2012 |
| KR | 10-2011-0124314 A | 11/2011 |
| KR | 10-2013-0044227 A | 5/2013 |
| WO | WO 2011/148823 A | 12/2011 |

* cited by examiner

DISPLAY APPARATUS

CROSS-REFERENCE TO RELATED APPLICATION

This application claims priority to and the benefit of Korean Patent Application No. 10-2014-0122928, filed on Sep. 16, 2014, in the Korean Intellectual Property Office, the disclosure of which is incorporated herein in its entirety by reference.

BACKGROUND

1. Field

One or more embodiments of the present invention relate to a display apparatus.

2. Description of the Related Art

Display apparatuses have recently been used in various applications. Also, as thicknesses and weights of display apparatuses have decreased, display apparatuses have been more widely used.

Display apparatuses include a display device that may provide an image to a user by generating at least one visible light.

A display apparatus includes various members in order to improve the quality of an image that is provided to a user. Various attempts have been made to improve image quality characteristics such as a viewing angle or color reproduction.

However, there are limitations to improving image quality characteristics of display apparatuses. For example, as display apparatuses have larger sizes and higher definition, it is more difficult to improve image quality characteristics.

SUMMARY

One or more embodiments of the present invention include a display apparatus having improved image quality characteristics.

Additional aspects of the present invention will be set forth in part in the description which follows and, in part, will be apparent from the description, or may be learned by practice of the presented embodiments.

According to one or more embodiments of the present invention, a display apparatus for displaying an image to a user includes: a display panel configured to generate visible light; and an optical functional layer including: a matrix mixed with a plurality of optical functional particles that are colored, wherein the optical functional layer is at a side of the display panel such that at least a part of the visible light from the display panel would pass through the optical functional layer.

The plurality of optical functional particles may be configured to absorb visible light of at least one color, and to transmit or diffuse visible light of other colors, from among the visible light generated by the display panel.

The plurality of optical functional particles may include a same tint as at least one color of visible light generated by the display panel.

The plurality of optical functional particles may include a chromatic material of one color and/or a chromatic material of an other color.

The chromatic material of the one color and/or the chromatic material of the other color may include a dye material.

The chromatic material of the one color and the chromatic material of the other color may be mixed with each other.

The chromatic material of the one color and/or the chromatic material of the other color may be formed on surfaces of the plurality of optical functional particles.

The chromatic material of the one color and/or the chromatic material of the other color may be formed inside the plurality of optical functional particles.

The chromatic material of the one color and the chromatic material of the other color may have different colors selected from among red, green, and blue.

The plurality of optical functional particles may include at least first optical functional particles and second optical functional particles, wherein the first optical functional particles include a chromatic material of a first color or a chromatic material of a second color that is different from the first color, and wherein the second optical functional particles include a chromatic material of the first color or a chromatic material of a third color that is different from the first color.

The plurality of optical functional particles may further include third optical functional particles, and the third optical functional particles may include a chromatic material of the second color or a chromatic material of the third color.

The first color, the second color, and the third color may be respectively red, green, and blue.

The first optical functional particles may include a red dye material and a green dye material, the second optical functional particles include a red dye material and a blue dye material, and the third optical functional particles include a green dye material and a blue dye material.

The display apparatus may further include optical functional particles that are transparent or white.

The matrix may include an organic material.

The display apparatus may further include a polarization layer on the optical functional layer, wherein the optical functional layer is between the display panel and the polarization layer, and wherein the matrix contacts the polarization layer and the display panel.

The display panel may include at least one display device, and the at least one display device may include a first electrode, a second electrode, and an intermediate layer that is disposed between the first electrode and the second electrode and may be configured to generate visible light.

According to one or more embodiments of the present invention, a display apparatus for displaying an image to a user includes: a display panel that includes a plurality of subpixels configured to generate different colors of visible light; and an optical functional layer including a matrix mixed with a plurality of optical functional particles that are colored, wherein the optical functional layer is configured to absorb visible light generated by at least one subpixel of the plurality of subpixels, and to transmit or diffuse visible light generated by another subpixel of the plurality of subpixels.

The plurality of subpixels may include a first subpixel, a second subpixel, and a third subpixel, wherein the first subpixel, the second subpixel, and the third subpixel may be configured to generate visible light of different colors, wherein the plurality of optical functional particles of the optical functional layer includes first optical functional particles, second optical functional particles, and third optical functional particles, wherein the first optical functional particles are configured to absorb visible light generated by the first subpixel and the second subpixel and to transmit and diffuse at least a part of visible light generated by the third subpixel, wherein the second optical functional particles are configured to absorb visible light generated by the first subpixel and the third subpixel and to transmit and diffuse at least a part of visible light generated by the second subpixel, and wherein the third optical functional particles are configured to absorb visible light generated by the second subpixel and the third subpixel and to transmit and diffuse at least a part of visible light generated by the first subpixel.

The first subpixel may be configured to generate visible light having a red tint, the second subpixel may be configured to generate visible light having a green tint, and the third subpixel may be configured to generate visible light having a blue tint.

BRIEF DESCRIPTION OF THE DRAWINGS

These and/or other aspects of the present invention will become apparent and more readily appreciated from the following description of the embodiments of the present invention, taken in conjunction with the accompanying drawings in which.

DETAILED DESCRIPTION

Figure 1:
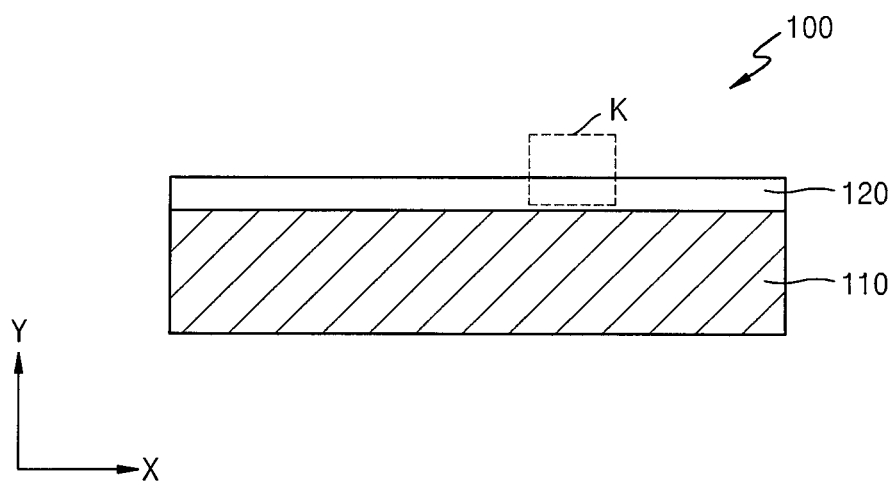
FIG. 1 is a cross-sectional view illustrating a display apparatus according to an embodiment.

The present invention may include various embodiments and modifications, and exemplary embodiments thereof will be illustrated in the drawings and will be described herein in detail. The effects and features of the present invention and the accompanying methods thereof will become apparent from the following description of the embodiments, taken in conjunction with the accompanying drawings. However, the present invention is not limited to the embodiments described below, and may be embodied in various modes.

It will be understood that although the terms "first", "second", etc. may be used herein to describe various elements, these elements should not be limited by these terms. These elements are only used to distinguish one element from another.

As used herein, the singular forms "a," "an" and "the" are intended to include the plural forms as well, unless the context clearly indicates otherwise. As used herein, the terms "use," "using," and "used" may be considered synonymous with the terms "utilize," "utilizing," and "utilized," respectively.

As used herein, the term "substantially," "about," and similar terms are used as terms of approximation and not as terms of degree, and are intended to account for the inherent deviations in measured or calculated values that would be recognized by those of ordinary skill in the art.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

It will be further understood that the terms "comprises" and/or "comprising" used herein specify the presence of stated features or components, but do not preclude the presence or addition of one or more other features or components.

It will be understood that when a layer, region, or element is referred to as being "formed on," another layer, region, or element, it can be directly or indirectly formed on the other layer, region, or element. That is, for example, intervening layers, regions, or elements may be present. Also, the term "exemplary" is intended to refer to an example or illustration.

Sizes of elements may be exaggerated for convenience of explanation. In other words, since sizes and thicknesses of elements in the drawings are arbitrarily illustrated for convenience of explanation, the following embodiments of the present invention are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment of the present invention may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. Expressions such as "at least one of," when preceding a list of elements, modify the entire list of elements and do not modify the individual elements of the list.

Embodiments of the present invention will now be described more fully with reference to the accompanying drawings, in which exemplary embodiments of the present invention are shown. In the drawings, the same or corresponding elements are denoted by the same reference numerals and a repeated explanation thereof will not be given.

Figure 2:
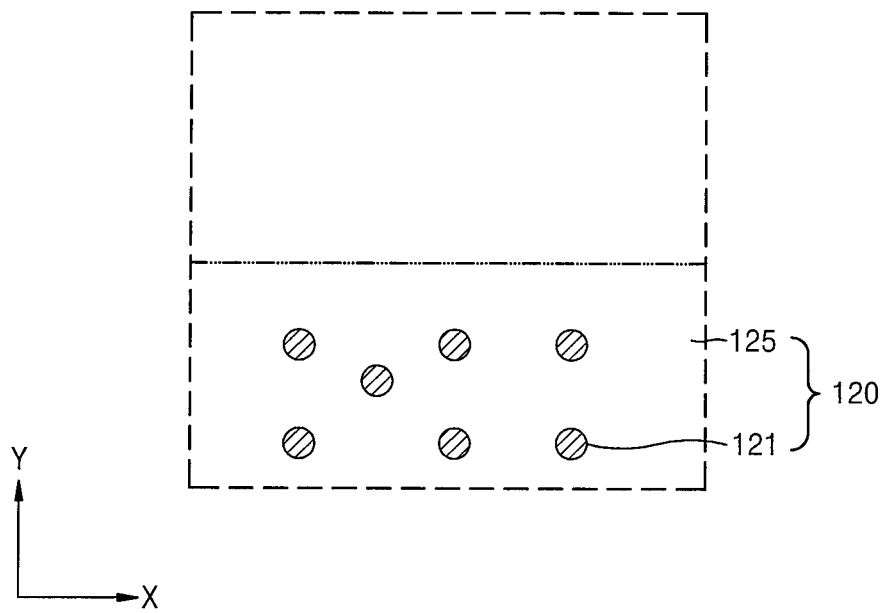
FIG. 2 is an enlarged cross-sectional view illustrating a portion K of FIG. 1.
Figure 3:
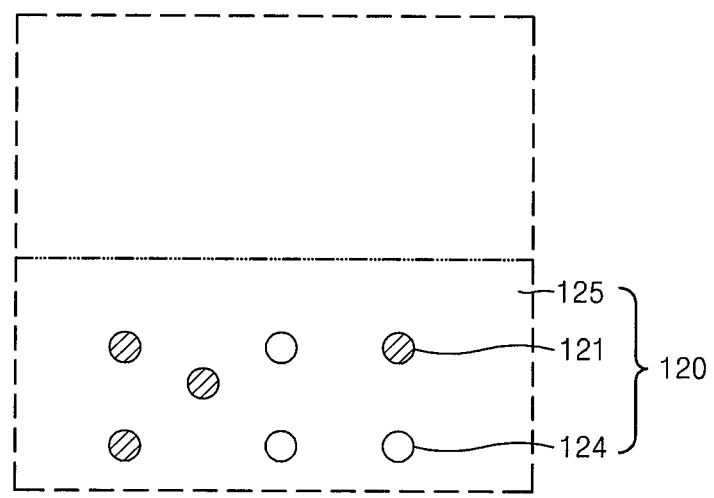
FIG. 3 is a cross-sectional view illustrating a modification of FIG. 2.

FIG. 1 is a cross-sectional view illustrating a display apparatus 100 according to an embodiment of the present invention. FIG. 2 is an enlarged cross-sectional view illustrating a portion K of FIG. 1. FIG. 3 is a cross-sectional view illustrating a modification of FIG. 2.

Referring to FIGS. 1 through 3, the apparatus 100 includes a display panel 110 and an optical functional layer 120.

The display panel 110 displays an image to a user. That is, although not shown in FIGS. 1 through 3, the display panel 110 may include a display device that may generate visible light that is to be provided to the user. Any of various suitable devices, for example, an organic light-emitting device or a liquid crystal display (LCD) device, may be used (e.g., utilized) as the display device. Also, any of various suitable types of display devices that may generate an image may be selectively used as the display device that is included in the display panel 110.

Although not shown in FIGS. 1 through 3, the display panel 110 provides an image upward, that is, from the bottom to the top in FIG. 1.

The optical functional layer 120 includes a matrix 125 and optical functional particles 121.

The matrix 125 may function as a base for the optical functional layer 120. The matrix 125 may be formed of any of various suitable materials, for example, an insulating material. For example, the matrix 125 may be formed to include an organic material.

Alternatively, the matrix 125 may be formed to include resin.

Alternatively, the matrix 125 may include a polymer material, for example, acryl-based resin.

Alternatively, the matrix 125 may be formed of an adhesive material. Any of various suitable adhesive materials, for example, adhesive resin, may be used as the adhesive material that is included in the matrix 125. In this case, the optical functional layer 120 may be easily disposed on the display panel 110. For example, as the matrix 125 contacts the display panel 110, the optical functional layer 120 may be stably adhered to the display panel 110.

The optical functional particles 121 may be colored, instead of being transparent or non-colored. For example, the optical functional particles 121 may include a chromatic material with a red or green tint. For example, the optical functional particles 121 may include a dye material with a red or green tint.

Alternatively, the optical functional particles 121 may include a chromatic material having a red tint and a chromatic material having a green tint. For example, the optical functional particles 121 may have a state where a chromatic material having a red tint and a chromatic material having a green tint are mixed with each other.

For example, the optical functional particles 121 may include a dye material with a red or green tint formed on surfaces thereof. Alternatively, the optical functional particles 121 may include a dye material with a red or green tint formed not only on surfaces thereof but also inside the optical functional particles 121.

The optical functional particles 121 may be formed by using any of various suitable methods. The optical functional particles 121 may be formed by performing dyeing on organic particles, inorganic particles, or metal particles. Examples of the organic particles used to form the optical functional particles 121 may include polymelamine, polystyrene, poly(methyl methacrylate) (PMMA), and polylactide, and examples of the inorganic particles used to form the optical functional particles 121 may include silica, alumina, titania, glass, and ceramic.

Although the optical functional particles 121 that are included in the optical functional layer 120 are colored, that is, include a chromatic material with a red or green tint in FIG. 2, the present embodiment is not limited thereto and optical functional particles that are unicolored may be optionally further included in the optical functional layer 120 as shown in FIG. 3. The optical functional particles 124 may be non-colored, for example, may be transparent or white.

The display apparatus 100 of the present embodiment includes the optical functional layer 120 that is disposed over the display panel 110, that is, on a side of the display panel 110 where an image is formed.

Also, the optical functional layer 120 includes the matrix 125 and the optical functional particles 121 that are mixed with the matrix 125. The optical functional particles 121 are colored. The colored optical functional particles 121 improve viewing angel characteristics of the display apparatus 100 by scattering visible light that is formed on the display panel 110. Also, color reproduction of the display apparatus 100 may be improved by enabling the optical functional particles 121 to be colored, instead of being non-colored, that is, to have the same or substantially the same tint as a color of visible light that is formed on the display panel 110.

For example, the optical functional particles 121 may be colored to have a red or green tint. Alternatively, the optical functional particles 121 may be dyed by mixing a dye material having a red tint and a dye material having a green tint so that the optical functional particles 121 have a red or green tint. In this case, the optical functional particles 121 may absorb visible light having a red tint and visible light having a green tint from among visible light provided from the display panel 110 and may transmit or diffuse visible light having a blue tint.

Accordingly, the quality of visible light having a blue tint, from among visible light that is provided from the display panel 110, may be improved and color reproduction of the visible light with the blue tint may be improved. Color reproduction may be improved by reducing a change in a difference between a refractive index of the matrix 125 and a refractive index of the optical functional particles 121 according to a wavelength band of the visible light with the blue tint from among the visible light that is formed on the display panel 110 by forming the optical functional particles 121 by mixing a dye material having a red tint and a dye material having a green tint with each other.

Alternatively, viewing angle characteristics may be improved by using light scattering of the optical functional layer 120 by enabling the optical functional particles 124 that are unicolored, for example, are transparent or white, to be optionally included in the optical functional layer 120.

Figure 4:
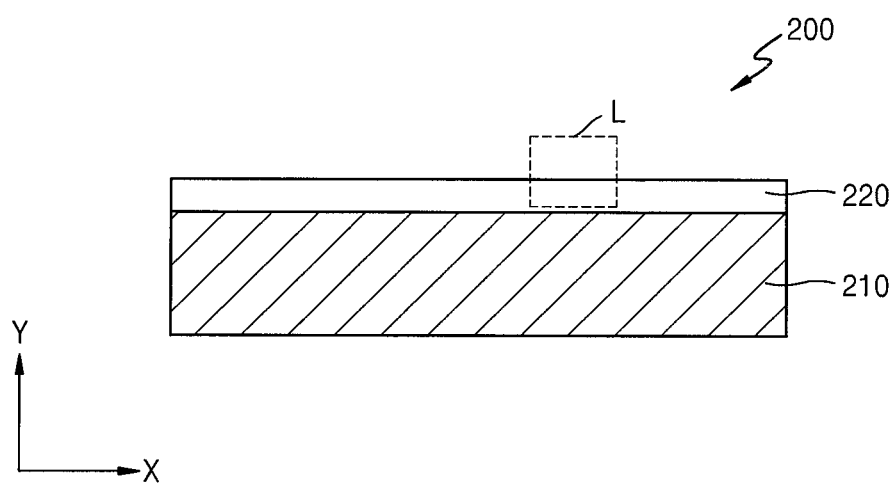
FIG. 4 is a cross-sectional view illustrating a display apparatus according to another embodiment.
Figure 5:
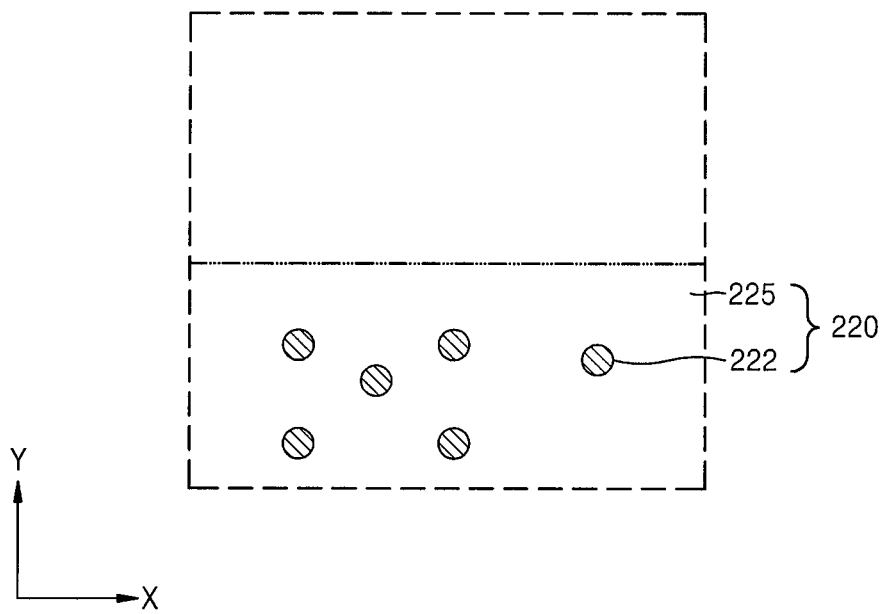
FIG. 5 is an enlarged cross-sectional view illustrating a portion L of FIG. 4.
Figure 6:
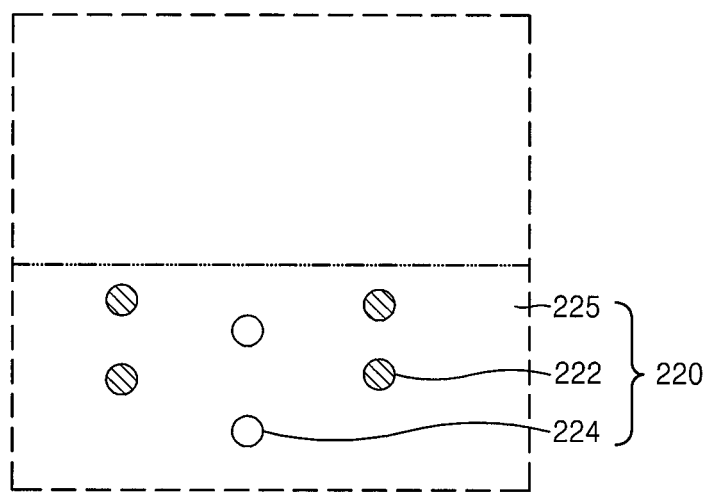
FIG. 6 is a cross-sectional view illustrating a modification of FIG. 5.

FIG. 4 is a cross-sectional view illustrating a display apparatus 200 according to another embodiment of the present invention. FIG. 5 is an enlarged cross-sectional view illustrating a portion L of FIG. 4. FIG. 6 is a cross-sectional view illustrating a modification of FIG. 5.

Referring to FIGS. 4 through 6, the display apparatus 200 includes a display panel 210 and an optical functional layer 220.

The display panel 210 displays an image to a user. That is, although not shown in FIGS. 4 through 6, the display panel 210 may include a display device that may generate visible light that is provided to the user. Any of various suitable devices, for example, an organic light-emitting device or an LCD device, may be used as the display device. Also, any of various suitable types of display devices that may generate an image may be selectively used as the display device that is included in the display panel 210.

Although not shown in FIGS. 4 through 6, the display panel 210 provides an image upward, that is, from the bottom to the top in FIG. 4.

The optical functional layer 220 includes a matrix 225 and optical functional particles 222.

The matrix 225 may function as a base for the optical functional layer 220. The matrix 225 may be formed of any of various suitable materials, for example, an insulating material. For example, the matrix 225 may be formed to include resin.

Alternatively, the matrix 225 may include a polymer material, for example, acryl-based resin.

Alternatively, the matrix 225 may be formed of an adhesive material. Any of various suitable adhesive materials, for example, adhesive resin, may be used as the adhesive material that is included in the matrix 225. In this case, the optical functional layer 220 may be easily disposed on the display panel 210. For example, as the matrix 225 contacts the display panel 210, the optical functional layer 220 may be stably adhered to the display panel 210.

The optical functional particles 222 are colored, instead of being transparent or non-colored. For example, the optical functional particles 222 may include a chromatic material with a red or blue tint. For example, the optical functional particles 222 may include a dye material with a red or blue tint.

Alternatively, the optical functional particles 222 may include a chromatic material having a red tint and a chromatic material having a blue tint. For example, the optical functional particles 222 may have a state where a chromatic material having a red tint and a chromatic material having a blue tint are mixed with each other.

For example, the optical functional particles 222 may include a dye material with a red or blue tint formed on surfaces thereof. Alternatively, the optical functional particles 222 may include a dye material with a red or blue tint formed not only on surfaces thereof but also inside the optical functional particles 222.

The optical functional particles 222 may be formed by using any of various suitable methods. The optical functional particles 222 may be formed by performing dyeing on organic particles, inorganic particles, or metal particles. Examples of the organic particles used to form the optical functional particles 222 may include polymelamine, polystyrene, PMMA, and polylactide, and examples of the inorganic particles used to form the optical functional particles 222 may include silica, alumina, titania, glass, and ceramic.

Although the optical functional particles 222 that are included in the optical functional layer 220 include a chromatic material with a red or blue tint in FIG. 5, the present embodiment is not limited thereto and optical functional particles 224 that are unicolored may be optionally further included in the optical functional layer 220 as shown in FIG. 6. The optical functional particles 224 may be non-colored, for example, may be transparent or white.

The display apparatus 200 of the present embodiment includes the optical functional layer 220 that is disposed over the display panel 210, that is, on a side of the display panel 210 where an image is formed.

Also, the optical functional layer 220 includes the matrix 225 and the optical functional particles 222 that are mixed with the matrix 225. The optical functional particles 222 are colored. The colored optical functional particles 222 improve viewing angle characteristics of the display apparatus 200 by scattering visible light that is formed on the display panel 210. Also, color reproduction of the display apparatus 200 may be improved by enabling the optical functional particles 222 to be colored, instead of, being non-colored, that is, to have the same or substantially the same tint as a color of the visible light that is formed on the display panel 210.

For example, the optical functional particles 222 may be colored to have a red or blue tint. Alternatively, the optical functional particles 222 may be dyed by mixing a dye material having a red tint and a dye material having a blue tint so that the optical functional particles 222 are colored to have red and blue tints. In this case. The optical functional particles 222 may absorb visible light having a red tint and visible light having a blue tint from among visible light that is provided from the display panel 210 and may transmit or diffuse visible light having a green tint.

Accordingly, the quality of visible light having a green tint, from among visible light that is provided from the display panel 210, may be improved and color reproduction of the visible light with the green tint may be improved. Color reproduction may be improved by reducing a change in a difference between a refractive index of the matrix 225 and a refractive index of the optical functional particles 222 according to a wavelength band of the visible light with the green tint from among the visible light that is formed on the display panel 210 by forming the optical functional particles 222 by mixing a dye material having a red tint and a dye material having a blue tint.

Alternatively, viewing angle characteristics may be improved by using light scattering of the optical functional layer 220 by enabling the optical functional particles 224 that are unicolored, for example, are transparent or white, to be optionally included in the optical functional layer 220.

Figure 7:
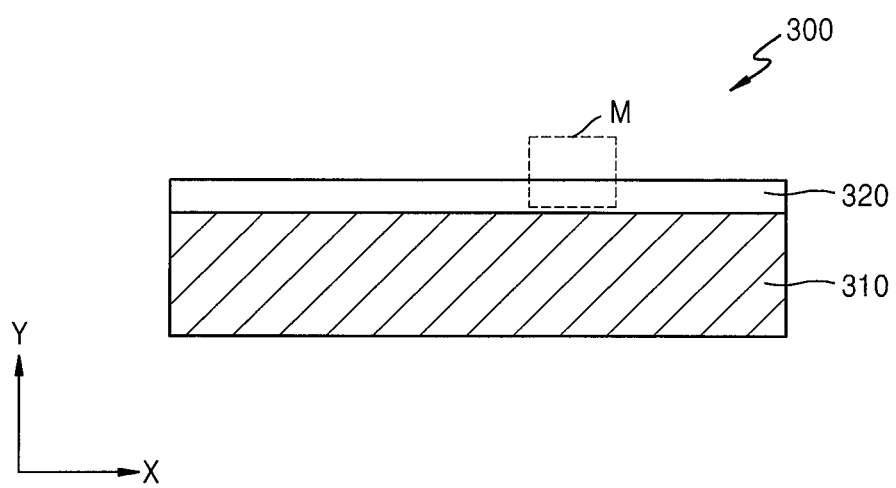
FIG. 7 is a cross-sectional view illustrating a display apparatus according to another embodiment.
Figure 8:
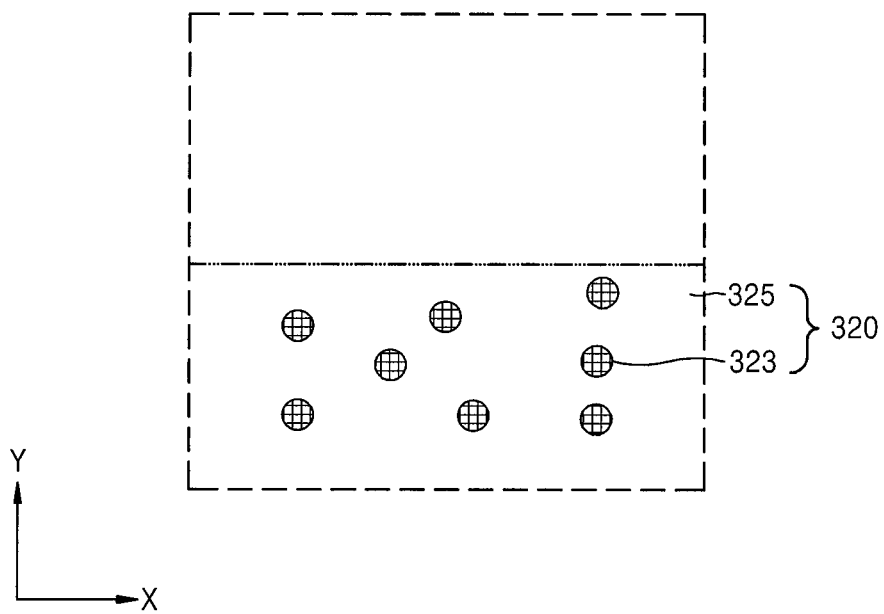
FIG. 8 is an enlarged cross-sectional view illustrating a portion M of FIG. 7.
Figure 9:
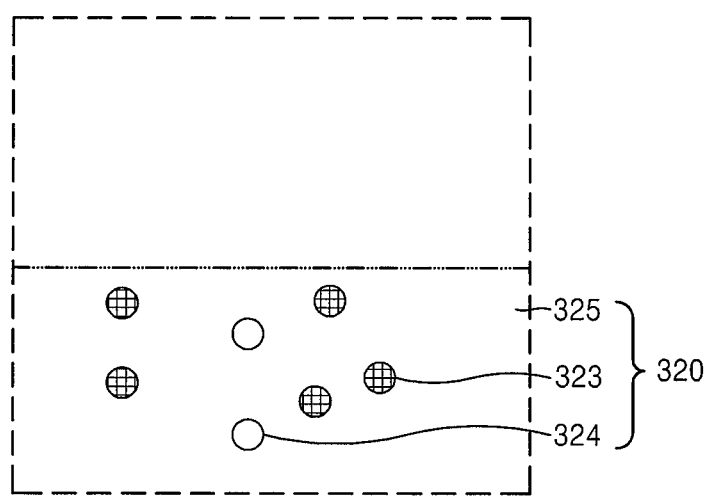
FIG. 9 is a cross-sectional view illustrating a modification of FIG. 8.

FIG. 7 is a cross-sectional view illustrating a display apparatus 300 according to another embodiment of the present invention. FIG. 8 is an enlarged cross-sectional view illustrating a portion M of FIG. 7. FIG. 9 is a cross-sectional view illustrating a modification of FIG. 8.

Referring to FIGS. 7 through 9, the display apparatus 300 includes a display panel 310 and an optical functional layer 320.

The display panel 310 displays an image to a user. That is, although not shown in FIGS. 7 through 9, the display panel 310 may include a display device that may generate visible light that is to be provided to the user. Any of various suitable devices, for example, an organic light-emitting device or an LCD device, may be used as the display device. Also, any of various suitable types of display devices that may generate an image may be used as the display device that is included in the display panel 310.

Although not shown in FIGS. 7 through 9, the display panel 310 provides an image upward, that is, from the bottom to the top in FIG. 4.

The optical functional layer 320 includes a matrix 325 and optical functional particles 323.

The matrix 325 may function as a base for the optical functional layer 320. The matrix 325 may be formed by using any of various suitable materials, for example, an insulating material. For example, the matrix 325 may be formed to include resin.

Alternatively, the matrix 325 may include a polymer material, for example, acryl-based resin.

Alternatively, the matrix 325 may be formed of an adhesive material. Any of various suitable adhesive materials, for example, adhesive resin, may be used as the adhesive material that is included in the matrix 325. In this case, the optical functional layer 320 may be easily disposed on the display panel 310. For example, as the matrix 325 contacts the display panel 310, the optical functional layer 320 may be stably adhered to the display panel 310.

The optical functional particles 323 are colored, instead of being transparent or non-colored. For example, the optical functional particles 323 may include a chromatic material with a green or blue tint. For example, the optical functional particles 323 may include a dye material with a green or blue tint.

Alternatively, the optical functional particles 323 may include a chromatic material having a green tint and a chromatic material having a blue tint. For example, the optical functional particles 323 may have a state where a chromatic material having a green tint and a chromatic material having a blue tint are mixed with each other.

For example, the optical functional particles 323 may include a dye material with a green or blue tint formed on surfaces thereof. Alternatively, the optical functional particles 323 may include a dye material with a green or blue tint formed not only on surfaces thereof but also inside the optical functional particles 323.

The optical functional particles 323 may be formed by using any of various suitable methods. The optical functional particles 323 may be formed by performing dyeing on organic particles, inorganic particles, or metal particles. Examples of the organic particles used to form the optical functional particles 323 may include polymelamine, polystyrene, PMMA, and polylactide, and examples of the inorganic particles used to form the optical functional particles 323 may include silica, alumina, titania, glass, and ceramic.

Although the optical functional particles 323 included in the optical functional layer 320 are colored, that is, include a chromatic material with a green or blue tint, in FIG. 8, the present embodiment is not limited thereto and optical functional particles 324 that are unicolored may also be optionally included in the optical functional layer 320 as shown in FIG. 9. The optical functional particles 324 may be non-colored (e.g., achromatic colored), for example, may be transparent or white.

The display apparatus 300 of the present embodiment includes the optical functional layer 320 that is disposed over the display panel 310, that is, on a side of the display panel 310 where an image is formed.

Also, the optical functional layer 320 includes the matrix 325 and the optical functional particles 323 that are mixed with the matrix 325, and the optical functional particles 323 are colored. The colored optical functional particles 323 improve viewing angle characteristics of the display apparatus 300 by scattering visible light that is formed on the display panel 310. Also, color reproduction of the display apparatus 300 may be improved by enabling the optical functional particles 323 to be colored, instead of being non-colored, that is, to have the same or substantially the same tint as a color of the visible light that is formed on the display panel 310.

For example, the optical functional particles 323 may be colored to have a green or blue tint. Alternatively, the optical functional particles 323 may be dyed by mixing a dye material having a green tint and a dye material having a blue tint so that the optical functional particles 323 are colored to have green and blue tints. In this case, the optical functional particles 323 may absorb visible light having a green tint and visible light having a blue tint from among visible light that is provided from the display panel 310.

Accordingly, the quality of visible light having a red tint, from among visible light that is provided from the display panel 310, may be improved. For example, color reproduction may be improved by reducing a change in a difference between a refractive index of the matrix 325 and a refractive index of the optical functional particles 323 according to a wavelength band of the visible light with the red tint from among the visible light that is formed on the display panel 310 by forming the optical functional particles 323 by mixing a dye material having a green tint and a dye material having a blue tint.

Alternatively, viewing angle characteristics may be improved by using light scattering of the optical functional layer 320 by enabling the optical functional particles 324 that are unicolored, for example, be transparent or white, to be optionally included in the optical functional layer 320.

Figure 10:
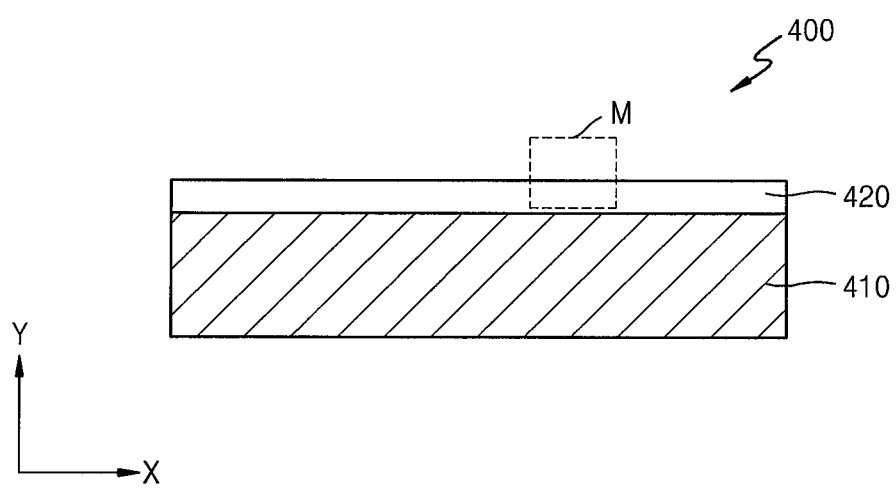
FIG. 10 is a cross-sectional view illustrating a display apparatus according to another embodiment.
Figure 11:
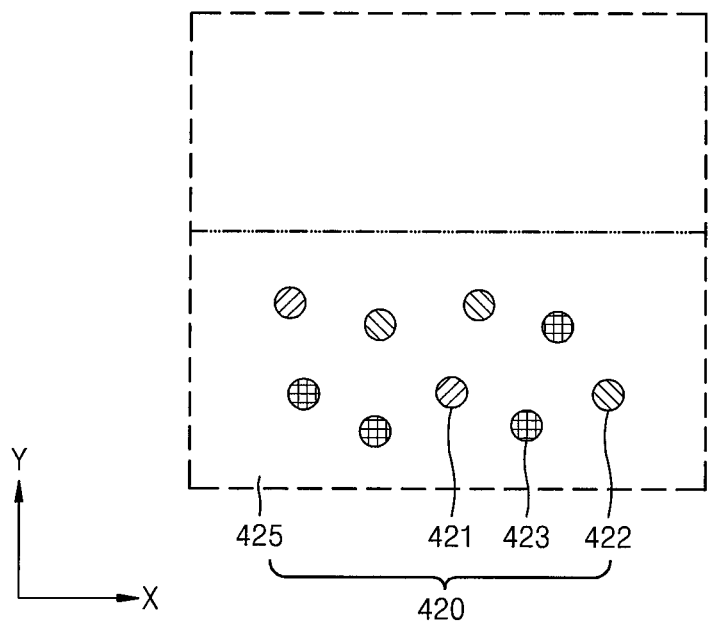
FIG. 11 is an enlarged cross-sectional view illustrating a portion N of FIG. 10.
Figure 12:
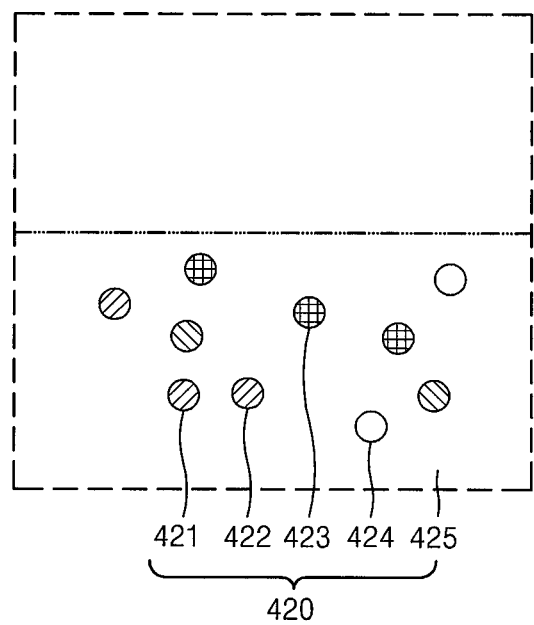
FIG. 12 is a cross-sectional view illustrating a modification of FIG. 11.

FIG. 10 is a cross-sectional view illustrating a display apparatus 400 according to another embodiment of the present invention. FIG. 11 is an enlarged cross-sectional view illustrating a portion N of FIG. 10. FIG. 12 is a cross-sectional view illustrating a modification of FIG. 11.

Referring to FIGS. 10 through 12, the display apparatus 400 includes a display panel 410 and an optical functional layer 420.

The display panel 410 displays an image to a user. That is, although not shown in FIGS. 10 through 12, the display panel 410 may include a display device that may generate visible light that is to be provided to the user. Any of various suitable devices, for example, an organic light-emitting device or an LCD device, may be used as the display device. Also, any of various suitable types of display devices that may generate an image may be used as the display device that is included in the display panel 410.

Although not shown in FIGS. 10 through 12, the display panel 410 provides an image upward, that is, from the bottom to the top in FIG. 4.

The optical functional layer 420 includes a matrix 425 and optical functional particles.

The matrix 425 may function as a base for the optical functional layer 420. The matrix 425 may be formed of any of various suitable materials, for example, an insulating material. For example, the matrix 425 may be formed to include resin.

Alternatively, the matrix 425 may include a polymer material, for example, acryl-based resin.

Alternatively, the matrix 425 may be formed of an adhesive material. Any of various suitable adhesive materials, for example, adhesive resin, may be used as the adhesive material that is included in the matrix 425. In this case, the optical functional layer 420 may be easily disposed on the display panel 410. For example, as the matrix 425 contacts the display panel 410, the optical functional layer 420 may be stably adhered to the display panel 410.

The optical functional particles are colored, instead of being transparent or non-colored. For example, the optical functional particles include first optical functional particles 421, second optical functional particles 422, and third optical functional particles 423.

The first optical functional particles 421 may include a chromatic material with a red or green tint. For example, the first optical functional particles 421 may include a dye material with a red or green tint.

Alternatively, the first optical functional particles 421 may include a chromatic material having a red tint and a chromatic material having a green tint. For example, the first optical functional particles 421 may have a state where a chromatic material having a red tint and a chromatic material having a green tint are mixed with each other.

For example, the first optical functional particles 421 may include a dye material with a red or green tint formed on surfaces thereof. Alternatively, the first optical functional particles 421 may include a dye material with a red or green tint formed not only on surfaces thereof but also inside the first optical functional particles 421.

The second optical functional particles 422 may include a chromatic material with a red or blue tint. For example, the second optical functional particles 422 may include a dye material with a red or blue tint.

Alternatively, the second optical functional particles 422 may include a chromatic material having a red tint and a chromatic material having a blue tint. For example, the second optical functional particles 422 may have a state where a chromatic material having a red tint and a chromatic material having a blue tint are mixed with each other.

For example, the second optical functional particles 422 may include a dye material with a red or blue tint formed on surfaces thereof. Alternatively, the second optical functional particles 422 may include a dye material with a red or blue tint formed not only on surfaces thereof but also inside the second optical functional particles 422.

The third optical functional particles 423 may include a chromatic material with a green or blue tint. For example, the third optical functional particles 423 may include a dye material with a green or blue tint.

Alternatively, the third optical functional particles 423 may include a chromatic material having a green tint and a chromatic material having a blue tint. For example, the third optical functional particles 423 may have a state where a chromatic material having a green tint and a chromatic material having a blue tint are mixed with each other.

For example, the third optical functional particles 423 may include a dye material with a green or blue tint formed on surfaces thereof. Alternatively, the third optical functional particles 423 may include a dye material with a green or blue tint formed not only on surfaces thereof but also inside the third optical functional particles 423.

The first through third optical functional particles 421, 422, and 423 may be formed by using any of various suitable methods. The first through third optical functional particles 421, 422, and 423 may be formed by performing dyeing on organic particles, inorganic particles, or metal particles. Examples of the organic particles used to form the first through third optical functional particles 421, 422, and 423 may include polymelamine, polystyrene, PMMA, and polylactide, and examples of the inorganic particles used to form the first through third optical functional particles 421, 422, and 423 may include silica, alumina, titania, glass, and ceramic.

Although the first through third optical functional particles 421, 422, and 423 included in the optical functional layer 420 include a chromatic material in FIG. 11, the present embodiment is not limited thereto and optical functional particles 424 that are unicolored may be optionally further included in the optical functional layer 420 as shown in FIG. 12. The optical functional particles 424 may be non-colored, for example, may be transparent or white.

The display apparatus 400 of the present embodiment includes the optical functional layer 420 that is disposed over the display panel 410, that is, on a side of the display panel 410 where an image is formed.

Also, the optical functional layer 420 includes the matrix 425 and the first through third optical functional particles 421, 422, and 423 that are mixed with the matrix 425. The first through third optical functional particles 421, 422, and 423 are colored. The first through third colored optical functional particles 421, 422, and 423 improve viewing angle characteristics of the display apparatus 400 by scattering visible light that is formed on the display panel 410. Also, color reproduction of the display apparatus 400 may be improved by enabling the first through third optical functional particles 421, 422, and 423 to be colored, instead of being non-colored, that is, to have the same or substantially the same tint as a color of the visible light that is formed on the display panel 410.

For example, the first optical functional particles 421 may be colored to have a red or green tint. Alternatively, the first optical functional particles 421 may be dyed by mixing a dye material having a red tint and a dye material having a green tint so that the first optical functional particles 421 are colored to have red and green tints. In this case, the first optical functional particles 421 may absorb visible light having a red tint and visible light having a green tint from among visible light that is provided from the display panel 410 and may transmit or diffuse visible light having a blue tint.

Accordingly, the quality of visible light having a blue tint, from among visible light that is provided from the display panel 410, may be improved and color reproduction of the visible light with the blue tint may be improved. Color reproduction may be improved by reducing a change in a difference between a refractive index of the matrix 425 and a refractive index of the first optical functional particles 421 according to a wavelength band of the visible light with the blue tint from among the visible light that is formed on the display panel 410 by forming the first optical functional particles 421 by mixing a dye material having a red tint and a dye material having a green tint.

For example, the second optical functional particles 422 may be colored to have a red or blue tint. Alternatively, the second optical functional particles 422 may be dyed by mixing a dye material having a red tint and a dye material having a blue tint so that the second optical functional particles 422 are colored to have red and blue tints. In this case, the second optical functional particles 422 may absorb visible light having a red tint and visible light having a blue tint from among visible light that is provided from the display panel 410 and may transmit or diffuse visible light having a green tint.

Accordingly, the quality of visible light having a green tint, from among visible light that is provided from the display panel 410, may be improved and color reproduction of the visible light with the green tint may be improved. Color reproduction may be improved by reducing a change in a difference between a refractive index of the matrix 425 and a refractive index of the second optical functional particles 422 according to a wavelength band of the visible light with the green tint from among the visible light that is formed on the display panel 410 by forming the second optical functional particles 422 by mixing a dye material having a red tint and a dye material having a blue tint.

For example, the third optical functional particles 423 may be colored to have a green or blue tint. Alternatively, the third optical functional particles 423 may be dyed by mixing a dye material having a green tint and a dye material having a blue tint so that the third optical functional particles 423 are colored to have green and blue tints. In this case, the third optical functional particles 423 may absorb visible light having a green tint and visible light having a blue tint from among visible light that is provided from the display panel 410 and may transmit or diffuse visible light having a red tint.

Accordingly, the quality of visible light having a red tint, from among visible light that is provided from the display panel 410, may be improved and color reproduction of the visible light with the red tint may be improved. Color reproduction may be improved by reducing a change in a difference between a refractive index of the matrix 425 and a refractive index of the third optical functional particles 423 according to a wavelength band of the visible light with the blue tint from among the visible light that is formed on the display panel 410 by forming the third optical functional particles 423 by mixing a dye material having a green tint and a dye material having a blue tint.

The first through third optical functional particles 421, 422, and 423 may include all of the optical functional particles 121 of FIGS. 1 and 2, the optical functional particles 222 of FIGS. 4 and 5, and the optical functional particles 323 of FIGS. 7 and 8. However, the present embodiment is not limited thereto, and the first through third optical functional particles 421, 422, and 423 may include only two from among the optical functional particles 121 of FIGS. 1 and 2, the optical functional particles 222 of FIGS. 4 and 5, and the optical functional particles 323 of FIGS. 7 and 8.

Alternatively, viewing angle characteristics may be improved by using light scattering of the optical functional layer 420 by enabling the optical functional particles 424 that are unicolored, for example, are transparent or white, to be optionally further included in the optical functional layer 420.

Figure 13:
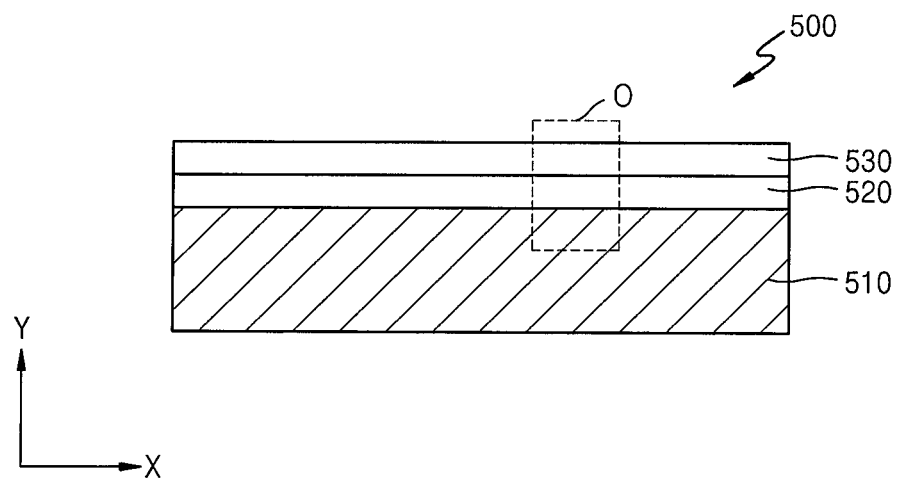
FIG. 13 is a cross-sectional view illustrating a display apparatus according to another embodiment.
Figure 14:
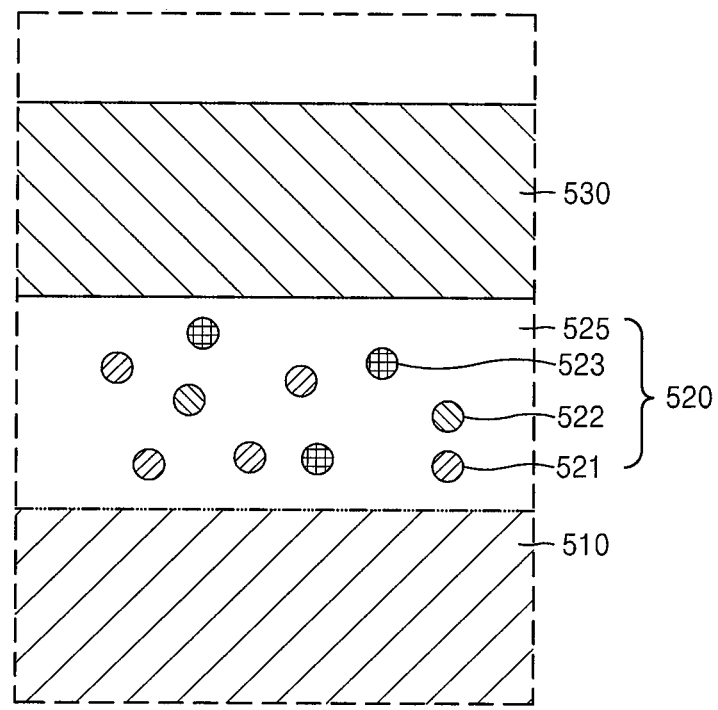
FIG. 14 is an enlarged cross-sectional view illustrating a portion O of FIG. 13.

FIG. 13 is a cross-sectional view illustrating a display apparatus 500 according to another embodiment of the present invention. FIG. 14 is an enlarged cross-sectional view illustrating a portion O of FIG. 13.

Referring to FIGS. 13 and 14, the display apparatus 500 includes a display panel 510, an optical functional layer 520, and a polarization layer 530.

The optical functional layer 520 includes a matrix 525 and optical functional particles.

The display panel 510 and the optical functional layer 520 of FIGS. 13 and 14 correspond to the display panel 410 and the optical functional layer 420 of FIGS. 10 and 11, and thus a detailed explanation thereof will not be given. Although not shown in FIGS. 13 and 14, the description of FIGS. 1 through 3, the description of FIGS. 4 through 6, the description of FIGS. 7 through 9, and/or the description of FIG. 12 may apply to the optical functional layer 520.

The optical functional layer 520 is disposed between the polarization layer 530 and the display panel 510. For example, the matrix 525 of the optical functional layer 520 may contact one surface of the display panel 510 and one surface of the polarization layer 530, and thus the display panel 510, the optical functional layer 520, and the polarization layer 530 may be stably adhered to one another.

Also, like in the previous embodiments of the present invention, image quality characteristics of the display apparatus 500 may be improved by improving viewing angle effect and color reproduction by using light scattering of the optical functional layer 520.

As described above in the previous embodiments of the present invention, the optical functional particles may be formed by using any of various suitable chromatic materials.

For example, the optical functional particles may be formed by using various suitable dyes or pigments.

When the optical functional particles are formed to include a chromatic material having a red tint, the optical functional particles may be formed by using a dye having a red tint such as C.I. Pigment Red 7, 9, 14, 41, 48:1, 48:2, 48:3, 48:4, 81.1, 81.2, 81.3, 97, 122, 123, 146, 149, 168, 177, 178, 180, 184, 185, 187, 192, 200, 202, 208, 210, 215, 216, 217, 220, 223, 224, 226, 227, 228, 240, 246, 254, 255, 264, or 272. Alternatively, a dye with a yellow or orange tint may also be used together.

When the optical functional particles are formed to include a chromatic material having a green tint, the optical functional particles may be formed by using a dye having a green tint such as C.I. Pigment Green 7, 10, 36, or 37.

When the optical functional particles are formed to include a chromatic material having a blue tint, the optical functional particles may be formed by using a dye having a blue tint such as C.I. Pigment Blue 15, 15:1, 15:2, 15:3, 15:4, 15:5, 16, 22, 60, or 64. Alternatively, a dye with a purple tint such as C.I. Pigment Violet 1, 19, 23, 27, 29, 30, 32, 37, 40, 42, or 50 may also be used.

Also, one or more selected from, for example, AcidRed138 (see the following chemical formula), Green3 (see the following chemical formula), and Blue97 (see the following chemical formula), may be used as a chromatic material used to form the optical functional particles.

Acid Red 138:

disodium 5-(acetylamino)-3-[(4-dodecylphenyl)azo]-4-hydroxynaphthalene-2,7-disulphonate

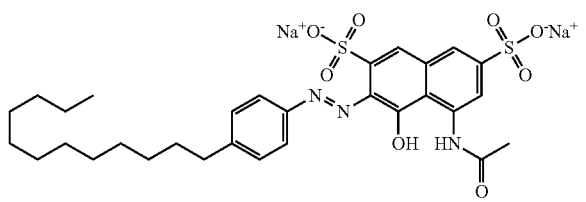

Green 3:

1,4-bis(p-tolylamino)anthraquinone

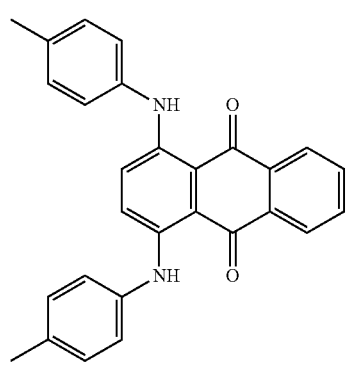 [SMILES: Cc1ccc(Nc2ccc(Nc3ccc(C)cc3)c3c2C(=O)c2ccccc2C3=O)cc1]

Blue 97:

1,4-Bis[(2,6-diethyl-4-methylphenyl)amino]anthraquinone; 1,4-Bis(2,6-diethyl-4-methylanilino)anthraquinone; or N,N'-Bis(2,6-diethyl-4-methylphenyl)-1,4-diaminoanthraquinone

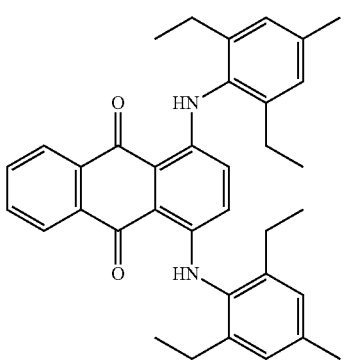 [SMILES: CCc1cc(C)cc(CC)c1Nc1ccc(Nc2c(CC)cc(C)cc2CC)c2c1C(=O)c1ccccc1C2=O]

Also, the optical functional particles may be formed by using any of various suitable methods. For example, a method of dipping unicolored particles in the chromatic material may be performed. Alternatively, any of various other suitable coating methods may be used.

FIGS. 15, 16A, 16B, and 17 are graphs for explaining image quality characteristics of a display apparatus, according to an embodiment of the present invention.

Figure 15:
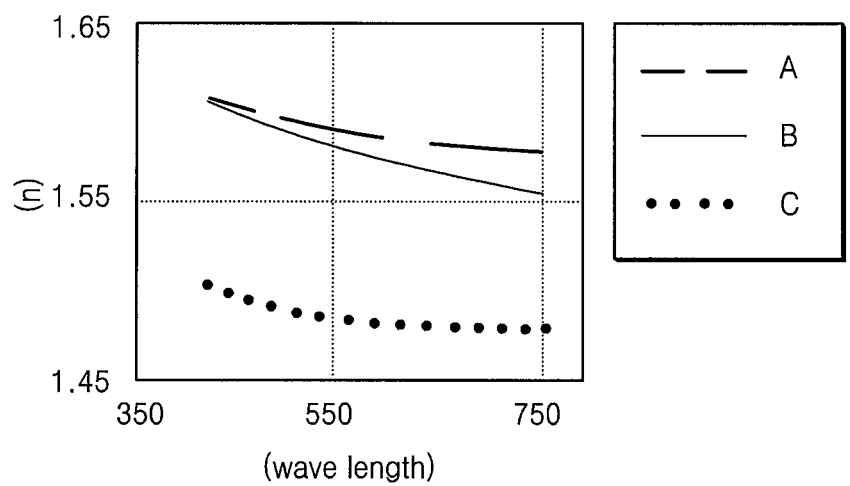
FIGS. 15, 16A, 16B, and 17 are graphs illustrating image quality characteristics of a display apparatus, according to an embodiment.

FIG. 15 will be first explained. In FIG. 15, the X-axis represents a wavelength of visible light and the Y-axis represents a refractive index.

Graph C of FIG. 15 shows a relationship between a refractive index and a wavelength of visible light for a matrix of an optical functional layer according to any of the previous embodiments of the present invention. For example, the graph C shows a relationship between a refractive index and a wavelength of visible light that is formed on a display panel. Referring to the graph C of FIG. 15, a refractive index decreases as a wavelength of visible light increases.

A graph A of FIG. 15 shows a relationship between a refractive index and a wavelength of visible light for optical functional particles of an optical functional layer according to any of the previous embodiments of the present invention, for example, the first through third optical functional particles 421, 422, and 423 of the optical functional layer 420 of FIGS. 10 and 11. For example, the graph A of FIG. 15 shows a relationship between a refractive index and a wavelength of visible light that is formed on a display panel. Referring to the graph A of FIG. 15, a refractive index decreases as a wavelength of visible light increases.

A graph B of FIG. 15 shows a relationship between a refractive index and a wavelength of visible light for optical functional particles of an optical functional layer when the optical functional particles are unicolored, instead of being colored, that is, are transparent or white. For example, the graph B of FIG. 15 shows a relationship between a refractive index and a wavelength of visible light that is formed on a display panel. Referring to the graph B of FIG. 15, a refractive index decreases as a wavelength of visible light increases.

Referring to FIG. 15, there is a difference of a refractive index between a matrix and optical functional particles. Also, the difference of the refractive index varies according to a wavelength of visible light. For example, in the graph B compared to the graph A of FIG. 15, a difference of a refractive index between an optical functional layer and a matrix greatly varies according to a wavelength of visible light and in the graph A, a difference of a refractive index between an optical functional layer and a matrix is almost constant. That is, when optical functional particles of the present embodiment are used, since a difference of a refractive index between a matrix and an optical functional layer is almost constant irrespective of a wavelength of visible light, a change in color reproduction according to the wavelength of visible light may be reduced, thereby improving image quality characteristics.

Figure 16A:
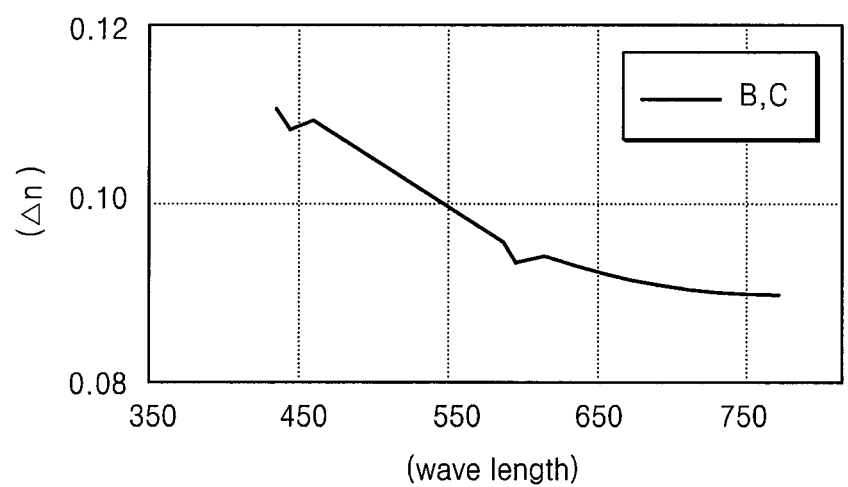
Figure 16B:
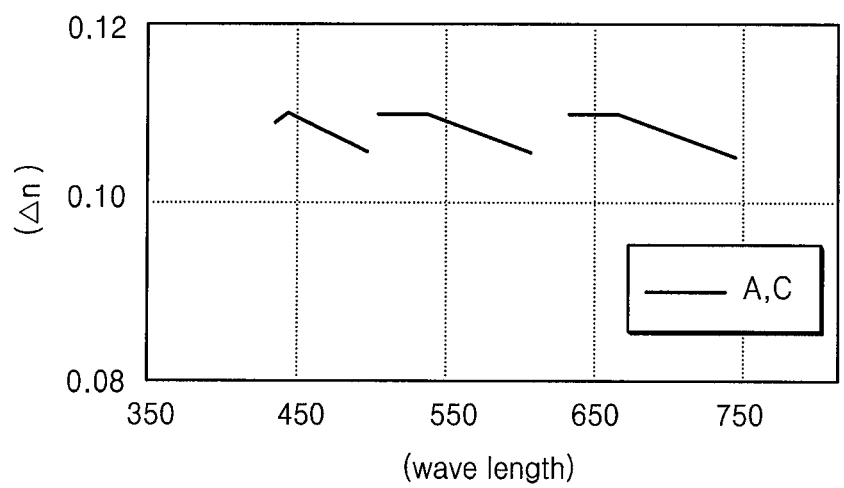

FIGS. 16A and 16B are detailed graphs of FIG. 15.

First, FIG. 16A shows a difference between the graphs B and C of FIG. 15, that is, a difference of a refractive index between an optical functional layer and a matrix of the graph B by precisely adjusting scales of the X-axis and the Y-axis compared to FIG. 15. Referring to FIG. 16A, a difference of a refractive index between an optical functional layer and a matrix greatly varies according to a wavelength of visible light. For example, a difference of a refractive index between an optical functional layer and a matrix decreases as a wavelength of visible light increases.

FIG. 16B shows a difference between the graphs A and C of FIG. 15, that is, a difference of a refractive index between an optical functional layer and a matrix by precisely adjusting scales of the X-axis and the Y-axis compared to FIG. 15. Referring to FIG. 16B, a difference of a refractive index between an optical functional layer and a matrix slightly varies according to a wavelength of visible light. A difference of a refractive index between an optical functional layer and a matrix is almost constant irrespective of a wavelength of visible light.

Figure 17:
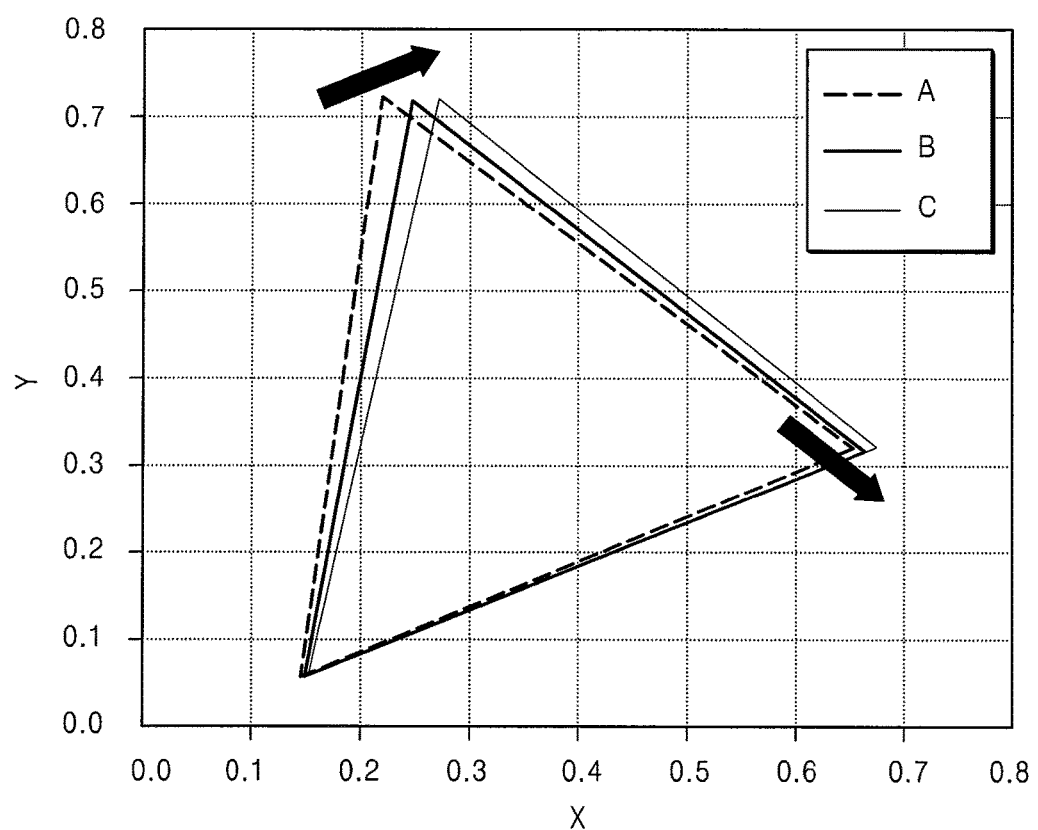

FIG. 17 is a color coordinate system illustrating color reproduction characteristics of a display apparatus when an optical functional layer is used. A graph A shows color coordinate characteristics of the display apparatus when optical functional particles of the optical functional layer are unicolored, instead of being colored, that is, are transparent or white. A graph B shows color coordinate characteristics of the display apparatus when the optical functional particles of the optical functional layer are colored, that is, when the optical functional layer according to any of the previous embodiments of the present invention, for example, the optical functional layer 420 of FIGS. 10 and 11, is included. A graph C shows reference color coordinate characteristics.

When the optical functional layer according to the previous embodiments of the present invention is included as shown in FIG. 17, the color display apparatus may have color coordinate characteristics that are almost the same as the reference color coordinate characteristics.

Figure 18:
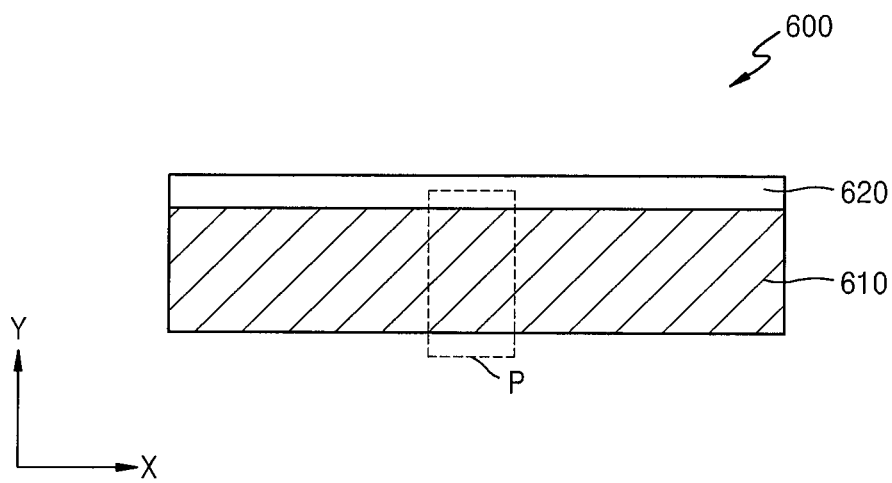
FIG. 18 is a cross-sectional view illustrating a display apparatus according to another embodiment.
Figure 19:
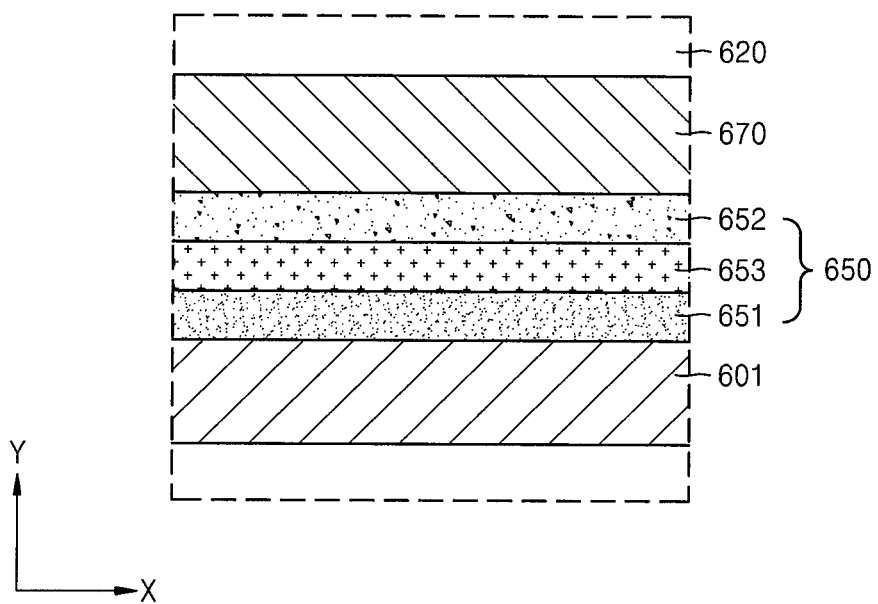
FIG. 19 is an enlarged cross-sectional view illustrating a portion P of FIG. 18.

FIG. 18 is a cross-sectional view illustrating a display apparatus 600 according to another embodiment of the present invention. FIG. 19 is a cross-sectional view illustrating a portion P of FIG. 18.

Referring to FIGS. 18 and 19, the display apparatus 600 includes a display panel 610 and an optical functional layer 620.

The display panel 610 displays an image to a user. The display panel 610 may include a display device 650 that may generate visible light that is to be provided to the user. Any of various suitable devices may be used as the display device 650. In the present embodiment, it is assumed that the display device 650 is an organic light-emitting device.

The display panel 600 will be explained in detail. The display panel 600 includes a substrate 601, the display device 650, and an encapsulation member 670.

The substrate 601 may be formed of any of various suitable materials. For example, the substrate 601 may be formed of a transparent glass material having $SiO_2$ as a main component. Alternatively, the substrate 601 may be formed of a transparent plastic material.

The display device 650 is formed on the substrate 601, and includes a first electrode 651, a second electrode 652, and an intermediate layer 653. For example, the first electrode 651 is formed on the substrate 601, the second electrode 652 is formed on the first electrode 651, and the intermediate layer 653 is formed between the first electrode 651 and the second electrode 652.

Although not shown in FIGS. 18 and 19, a buffer layer (not shown) may be further formed on the first electrode 651 and the substrate 601. The buffer layer may provide a planarized surface on the substrate 601, and may prevent or reduce moisture or gas from penetrating the substrate 601.

The first electrode 651 may function as an anode and the second electrode 652 may function as a cathode. However, polarities of the first electrode 651 and the second electrode 652 may be reversed.

When the first electrode 651 functions as an anode, the first electrode 651 may include ITO, IZO, ZnO, or $In_2O_3$ having a high work function. According to the purposes and design conditions, the first electrode 651 may further include a reflective film formed of silver (Ag), magnesium (Mg), aluminum (Al), platinum (Pt), palladium (Pd), gold (Au), nickel (Ni), neodymium (Nd), iridium (Ir), chromium (Cr), lithium (Li), ytterbium (Yb), or calcium (Ca).

When the second electrode 652 functions as a cathode, the second electrode 652 may be formed of a metal such as Ag, Mg, Al, Pt, Pd, Au, Ni, Nd, Ir, Cr, Li, or Ca. Alternatively, the second electrode 652 may include ITO, IZO, ZnO, or $In_2O_3$ in order to allow light to pass therethrough.

The intermediate layer 653 includes at least one organic light-emitting layer. Also, the intermediate layer 653 may include at least one selected from a hole injection layer (HIL), a hole transport layer (HTL), an electron transport layer (ETL), and an electron injection layer (EIL), in addition to the organic light-emitting layer.

When a voltage is applied to the first electrode 651 and the second electrode 652, the intermediate layer 653 (i.e., the organic light-emitting layer of the intermediate layer 653) generates visible light.

The encapsulation member 670 is disposed on the display device 650 to protect the display device 650. The encapsulation member 670 may protect the display device 650 from external impact, and reduce or prevent penetration of an external material or moisture.

The encapsulation member 670 may be formed of any of various suitable materials. For example, the encapsulation member 670 may be formed of a transparent glass material having $SiO_2$ as a main component.

Alternatively, the encapsulation member 670 may be formed of a glass material through which light may pass.

Alternatively, the encapsulation member 670 may be formed by using an inorganic film or an organic film.

Alternatively, the encapsulation member 670 may be formed by stacking at least one organic film and at least one inorganic film. In this case, the encapsulation member 670 may be formed by selectively alternately stacking the at least one organic film and the at least one inorganic film.

Although not shown in FIGS. 18 and 19, the display panel 610 provides an image upward, that is, toward the optical functional layer 620 in FIG. 19.

The optical functional layer 620 includes a matrix (not shown) and optical functional particles (not shown). The optical functional layer 620 may correspond to one of the optical functional layers 120, 220, 320, 420, and 520 of the previous embodiments of the present invention, and thus a detailed explanation thereof will not be given.

The display panel 610 may include a thin-film transistor (TFT) that transmits a necessary signal to the display device 650 in order to drive the display device 650, which will be explained in detail with reference to FIG. 20.

Figure 20:
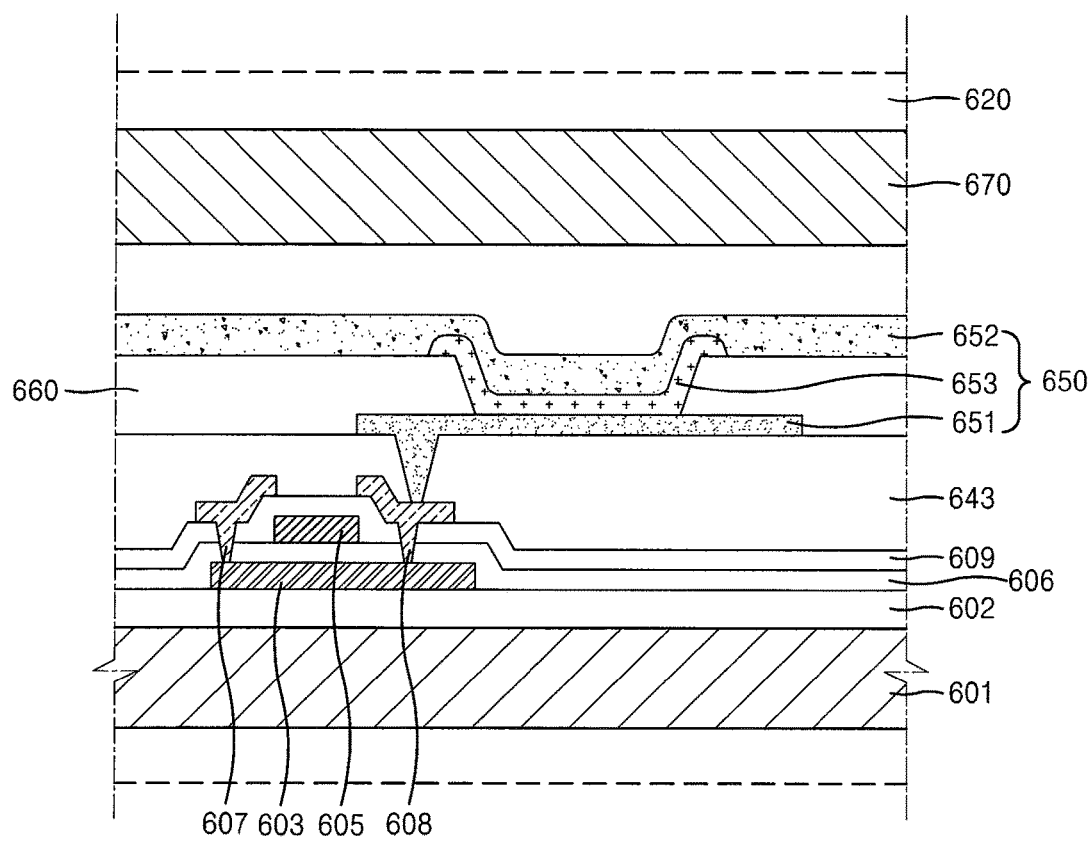
FIG. 20 is a cross-sectional view illustrating a modification of FIG. 19.

FIG. 20 is a cross-sectional view illustrating a modification of FIG. 19. Referring to FIG. 20, the display panel 610 includes the substrate 601, the display device 650, a TFT, and the encapsulation member 670.

The TFT includes an active layer 603, a gate electrode 605, a source electrode 607, and a drain electrode 608.

A detailed explanation will now be made.

A buffer layer 602 may be formed on the substrate 601. The buffer layer 602 that prevents or substantially prevents impurity elements from penetrating the substrate 601 and provides a planarized surface on the substrate 601 may be formed of any of various suitable materials. The buffer layer 602 is an optional element and thus may be omitted in some embodiments.

The active layer 603 is disposed on the buffer layer 602 and may have a pattern (e.g., a predetermined pattern). The active layer 603 may be formed of an inorganic semiconductor material such as silicon. Alternatively, the active layer 603 may be formed of an organic semiconductor material or an oxide semiconductor material.

The gate insulating film 606 is formed on the active layer 603. The gate insulating film 606 may be formed of any of various suitable insulating materials, for example, oxide or nitride.

The gate electrode 605 is formed on a gate insulating film 606 to correspond to the active layer 603 (e.g., a predetermined portion of the active layer 603). The gate electrode 605 may be formed of a material having high conductivity. For example, the gate electrode 605 may include Au, Ag, Cu, Ni, Pt, Pd, Al, or molybdenum (Mo), or an alloy such as Al:Nd or Mo:W. However, the present embodiment is not limited thereto, and the gate electrode 605 may be formed of any of various other suitable materials.

An interlayer insulating film 609 is formed to cover the gate electrode 605.

The source electrode 607 and the drain electrode 608 are formed on the interlayer insulating film 609. The source electrode 607 and the drain electrode 608 are formed to contact the active layer 603 (e.g., predetermined portions of the active layer 603).

A passivation layer 643 is formed to cover the source electrode 607 and the drain electrode 608. Although not shown in FIG. 20, an insulating film may be further formed on the passivation layer 643 to planarize the TFT.

Although not shown in FIG. 20, at least one TFT, that may be coupled (e.g., electrically connected, connected, or electrically coupled) to the display device 650, may also be provided, and at least one capacitor that may be coupled to the display device 650 or the TFT may also be provided.

The first electrode 651 is formed on the passivation layer 643. The first electrode 651 is coupled to one of the source electrode 607 and the drain electrode 608. For example, the first electrode 651 is coupled to the drain electrode 608.

A pixel-defining film 660 is formed on the first electrode 651 to expose a portion of the first electrode 651 (e.g., a predetermined portion of the first electrode 651).

The intermediate layer 653 is formed on the first electrode 651. The intermediate layer 653 includes an organic light-emitting layer. Alternatively, the intermediate layer 653 may further include at least one selected from an HIL, an HTL, an ETL, and an EIL, in addition to the organic light-emitting layer.

The second electrode 652 is formed on the intermediate layer 653.

The encapsulation member 670 is disposed on the display device 650 to protect the display device 650.

The display apparatus 600 of the present embodiment and the modification thereof include the optical functional layer 620 that is disposed over the display panel 610, that is, on a side of the display panel 610 where an image is formed.

Also, color reproduction of the display apparatus 600 may be improved by using the optical functional layer 620.

Figure 21:
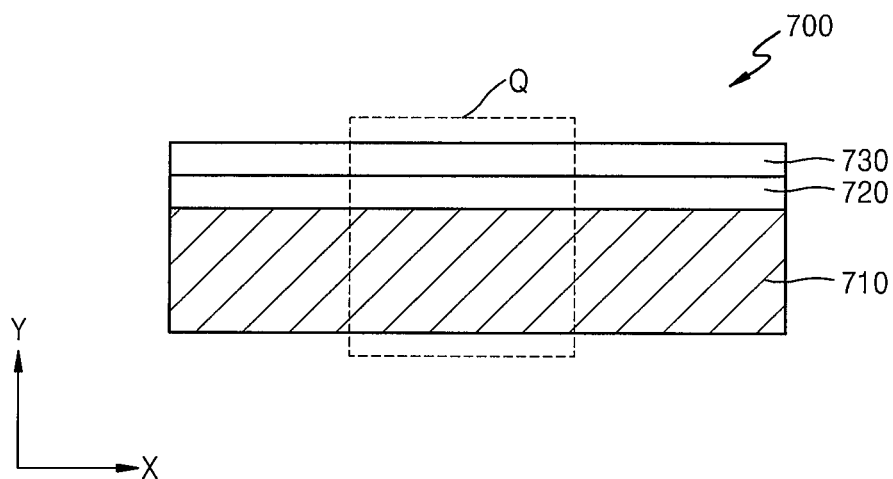
FIG. 21 is a cross-sectional view illustrating a display apparatus according to another embodiment.
Figure 22:
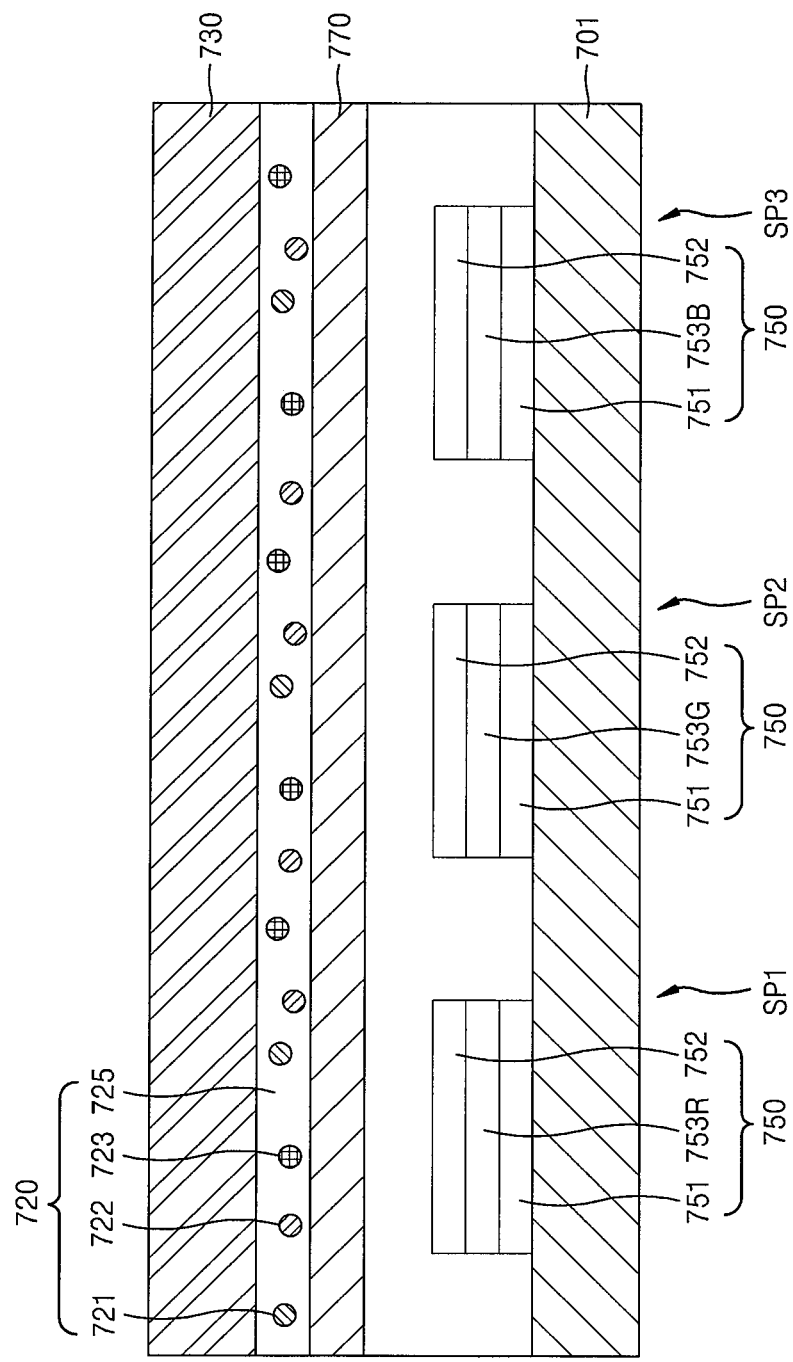
FIG. 22 is an enlarged cross-sectional view illustrating a portion Q of FIG. 21.

FIG. 21 is a cross-sectional view illustrating a display apparatus 700 according to another embodiment of the present invention. FIG. 22 is an enlarged cross-sectional view illustrating a portion Q of FIG. 21, Referring to FIGS. 21 and 22, the display apparatus 700 includes a display panel 710, an optical functional layer 720, and a polarization layer 730.

The display panel 710 includes at least one subpixel. The subpixel may include at least one display device 750. Any of various suitable devices may be used as the display device 750. In the present embodiment, it is assumed that the display device 750 is an organic light-emitting device.

The display panel 710 will be explained in detail. The display panel 700 includes one or more subpixels SP1, SP2, and SP3 that are formed on a substrate 701 and an encapsulation member 770. Each of the subpixels SP1, SP2, and SP3 may include the display device 750.

The substrate 701 may be formed of any of various suitable materials. For example, the substrate 701 may be formed of a transparent glass material having $SiO_2$ as a main component. Alternatively, the substrate 701 may be formed of a transparent plastic material.

The subpixels SP1, SP2, and SP3 are disposed on the substrate 701.

The subpixel SP1 includes a first electrode 751, a second electrode 752, and an intermediate layer 753R. For example, the first electrode 751 is formed on the substrate 701, the second electrode 752 is formed on the first electrode 751, and the intermediate layer 753R is formed between the first electrode 751 and the second electrode 752.

Although not shown in FIGS. 21 and 22, a buffer layer (not shown) may be further formed on the first electrode 751 and the substrate 701. The buffer layer may provide a planarized surface on the substrate 701 and may prevent or reduce moisture or gas from penetrating the substrate 701. In this case, the buffer layer may be formed on the substrate 701 to be shared by the subpixels SP1, SP2, and SP3.

The intermediate layer 753R includes at least one organic light-emitting layer. Also, the intermediate layer 753R generates visible light having a red tint. The intermediate layer 753R may include at least one selected from an HIL, an HTL, an ETL, and an EIL, in addition to the organic light-emitting layer.

The subpixel SP2 includes the first electrode 751, the second electrode 752, and an intermediate layer 753G. For example, the first electrode 751 is formed on the substrate 701, the second electrode 752 is formed on the first electrode 751, and the intermediate layer 753G is formed between the first electrode 751 and the second electrode 752.

The intermediate layer 753G includes at least one organic light-emitting layer. Also, the intermediate layer 753G may generate visible light having a green tint. The intermediate layer 753G may include at least one selected from an HIL, an HTL, an ETL, and an EIL, in addition to the organic light-emitting layer.

The subpixel SP3 includes the first electrode 751, the second electrode 752, and an intermediate layer 753B. For example, the first electrode 751 is formed on the substrate 701, the second electrode 752 is formed on the first electrode 751, and the intermediate layer 753B is formed between the first electrode 751 and the second electrode 752.

The intermediate layer 753B includes at least one organic light-emitting layer. Also, the intermediate layer 753B may generate visible light having a blue tint. The intermediate layer 753B may include at least one selected from an HIL, an HTL, an ETL, and an EIL, in addition to the organic light-emitting layer.

Although the second electrode 752 is separately formed for each of the subpixels SP1, SP2, and SP3 in FIG. 22, the present embodiment is not limited thereto and the second electrode 752 may be commonly formed in the subpixels SP1, SP2, and SP3.

The first electrode 751 and the second electrode 752 correspond to those described in the previous embodiments of the present invention, and thus a detailed explanation thereof will not be given.

The encapsulation member 770 is disposed over the display devices 750 to protect the subpixels SP1, SP2, and SP3. The encapsulation member 770 may protect the display devices 750 from external impact, and may reduce or prevent penetration of an external material or moisture.

The encapsulation member 770 corresponds to that described in the previous embodiments of the present invention, and thus a detailed explanation thereof will not be given.

Although not shown in FIGS. 21 and 22, the display panel 710 provides an image upward, that is, toward the optical functional layer 720 in FIG. 22.

The optical functional layer 720 includes a matrix 725 and optical functional particles.

The matrix 725 may function as a base for the optical functional layer 720. The matrix 725 may be formed of any of various suitable materials, for example, an insulating material. For example, the matrix 725 may be formed to include resin.

Alternatively, the matrix 725 may include a polymer material, for example, acryl-based resin.

Alternatively, the matrix 725 may be formed of an adhesive material. Any of various suitable adhesive materials, for example, adhesive resin, may be used as the adhesive material that is included in the matrix 725. Accordingly, the optical functional layer 720 may be easily disposed on the display panel 710. For example, as the matrix 725 contacts the display panel 710, the optical functional layer 720 may be stably adhered to the display panel 710.

Also, due to the adhesiveness of the matrix 725, the polarization layer 730 that is disposed on the optical functional layer 720 may be stably adhered to the optical functional layer 720.

The optical functional particles are colored, instead of being transparent or non-colored. For example, the optical functional particles include first optical functional particles 721, second optical functional particles 722, and third optical functional particles 723.

The first optical functional particles 721 may include a chromatic material with a red or green tint. For example, the first optical functional particles 721 may include a dye material with a red or green tint.

Alternatively, the first optical functional particles 721 may include a chromatic material having a red tint and a chromatic material having a green tint. For example, the first optical functional particles 721 may have a state where a chromatic material having a red tint and a chromatic material having a green tint are mixed with each other.

For example, the first optical functional particles 721 may include a dye material with a red or green tint formed on surfaces thereof. Alternatively, the first optical functional particles 721 may include a dye material with a red or green tint formed not only on surfaces thereof but also inside the first optical functional particles 721.

The second optical functional particles 722 may include a chromatic material with a red or blue tint. For example, the second optical functional particles 722 may include a dye material with a red or blue tint.

Alternatively, the second optical functional particles 722 may include a chromatic material having a red tint and a chromatic material having a blue tint. For example, the second optical functional particles 722 may have a state where a chromatic material having a red tint and a chromatic material having a blue tint are mixed with each other.

For example, the second optical functional particles 722 may include a dye material with a red or blue tint formed on surfaces thereof. Alternatively, the second optical functional particles 722 may include a dye material with a red or blue tint formed not only on surfaces thereof but also inside the second optical functional particles 722.

The third optical functional particles 723 may include a chromatic material with a green or blue tint. For example, the third optical functional particles 723 may have a state where a chromatic material having a green tint and a color material having a blue tint are mixed with each other.

For example, the third optical functional particles 723 may include a dye material with a green or blue tint formed on surfaces thereof. Alternatively, the third optical functional particles 723 may include a dye material with a green or blue tint formed not only on surfaces thereof but also inside the third optical functional particles 723.

The first through third optical functional particles 721, 722, and 723 may be formed by using any of various suitable methods. The first through third optical functional particles 721, 722, and 723 may be formed by performing dyeing on organic particles, inorganic particles, or metal particles. Examples of the organic particles used to form the first through third optical functional particles 721, 722, and 723 may include polymelamine, polystyrene, PMMA, and polylactide, and examples of the inorganic particles used to form the first through third optical functional particles 721, 722, and 723 may include silica, alumina, titania, glass, and ceramic.

Also, any of various suitable dyes described in the previous embodiments of the present invention may be used during dyeing performed in order for the first through third optical functional particles 721, 722, and 723 of the optical functional layer 720 to be colored.

Also, the first through third optical functional particles 721, 722, and 723 may be formed by using any of various suitable methods. For example, a method of dipping organic particles, inorganic particles, or metal particles in any of various suitable chromatic materials described in the previous embodiments of the present invention may be performed. Alternatively, any of various other suitable coating methods may be used.

Although the first through third optical functional particles 721, 722, and 723 included in the optical functional layer 720 include a chromatic material in FIG. 22, the present embodiment is not limited thereto and optical functional particles (not shown) that are unicolored may be further included in the optical functional layer 720. In this case, the optical functional particles that are unicolored may be non-colored, for example, may be transparent or white.

The polarization layer 730 may be disposed over the optical functional layer 720. Alternatively, the polarization layer 730 may be disposed on the optical functional layer 720 to be adhered to, that is, to contact the optical functional layer 720.

The display apparatus 700 of the present embodiment includes the optical functional layer 720 that is disposed over the display panel 710, that is, on a side of the display panel 710 where an image is formed.

Also, the optical functional layer 720 includes the matrix 725 and the first through third optical functional particles 721, 722, and 723 that are mixed with the matrix 725. The first through third optical functional particles 721, 722, and 723 are colored. The first through third colored optical functional particles 721, 722, and 723 improve viewing angle characteristics of the display apparatus 700 by scattering visible light that is formed on the display panel 710. Also, color reproduction of the display apparatus 700 may be improved by enabling the first through third optical functional particles 721, 722, and 723 to be colored, instead of being non-colored, that is, to have the same or substantially the same tint as a color of the visible light that is formed on the display panel 710.

For example, the first optical functional particles 721 may be colored to have a red or green tint. Alternatively, the first optical functional particles 721 may be dyed by mixing a dye material having a red tint and a dye material having a green tint by enabling the first optical functional particles 721 to be colored to have red and green tints. In this case, the first optical functional particles 721 may absorb visible light having a red tint that is provided from the subpixel SP1 of the display panel 710 and visible light having a green tint that is provided from the subpixel SP2, and may transmit or diffuse visible light having a blue tint that is provided from the subpixel SP3.

Accordingly, the quality of visible light having a blue tint from among visible light that is provided from the display panel 710 may be improved. For example, color reproduction may be improved by reducing a change in a difference between a refractive index of the matrix 725 and a refractive index of the first optical functional particles 721 according to a wavelength band of the visible light with the blue tint from among the visible light that is formed on the display panel 710 by forming the first optical functional particles 721 by mixing a dye material having a red tint and a dye material having a green tint.

Also, the second optical functional particles 722 may be colored to have a red or blue tint. Alternatively, the second optical functional particles 722 may be dyed by mixing a dye material having a red tint and a dye material having a blue tint by enabling the second optical functional particles 722 to be colored to have red and blue tints. In this case, the second optical functional particles 722 may absorb visible light having a red tint that is provided from the subpixel SP1 of the display panel 710 and visible light having a blue tint that is provided from the subpixel SP3, and may transmit or diffuse visible light having a green tint that is provided from the subpixel SP2.

Accordingly, the quality of visible light having a green tint from among visible light that is provided from the display panel 710 may be improved. For example, color reproduction may be improved by reducing a change in a difference between a refractive index of the matrix 725 and a refractive index of the second optical functional particles 722 according to a wavelength band of the visible light with the green tint from among the visible light that is formed on the display panel 710 by forming the second optical functional particles 722 by mixing a dye material having a red tint and a dye material having a blue tint.

Also, the third optical functional particles 723 may be colored to have a green or blue tint. Alternatively, the third optical functional particles 723 may be dyed by mixing a dye material having a green tint and a dye material having a blue tint to be colored to have green and blue tints. In this case, the third optical functional particles 723 may absorb visible light having a green tint that is provided from the subpixel SP2 of the display panel 710 and visible light having a blue tint that is provided from the subpixel SP3, and may transmit or diffuse visible light having a red tint that is provided from the subpixel SP1.

Accordingly, the quality of visible light having a red tint, from among visible light that is provided from the display panel 710, may be improved and color reproduction of the visible light with the red tint may be improved. Color reproduction may be improved by reducing a change in a difference between a refractive index of the matrix 725 and a refractive index of the third optical functional particles 723 according to a wavelength band of the visible light with the red tint from among the visible light that is formed on the display panel 710 by forming the third optical functional particles 723 by mixing a dye material having a green tint and a dye material having a blue tint.

Although not shown in FIGS. 21 and 22, the display panel 710 may further include a TFT that transmits a necessary signal to the display device 750 in order to drive the display device 750.

As described above, according to the one or more of the previous embodiments of the present invention, a display apparatus having improved image quality characteristics may be provided.

While one or more embodiments have been described with reference to the figures, it will be understood by those of ordinary skill in the art that various changes in form and details may be made therein without departing from the spirit and scope of the present invention as defined by the following claims and their equivalents. Accordingly, the true technical scope of the present invention is defined by the technical spirit of the appended claims and their equivalents.

What is claimed is:

1. A display apparatus for displaying an image to a user, the display apparatus comprising:
   a display panel configured to generate visible light, the display panel comprising a first sub-pixel configured to emit light of only a first color and a second sub-pixel configured to emit light of only a second color different from the first color; and
   an optical functional layer arranged apart from the first sub-pixel and the second sub-pixel, the first sub-pixel being configured to emit the light of only the first color to the optical functional layer, and the second sub-pixel being configured to emit the light of only the second color to the optical functional layer, the optical function layer being configured to receive the light of only the first color and the light of only the second color, the optical functional layer comprising:
      a matrix mixed with a plurality of optical functional particles that are colored,
   wherein the optical functional layer is at a side of the display panel such that at least a part of the visible light from the display panel would pass through the optical functional layer.

2. The display apparatus of claim 1, wherein the plurality of optical functional particles are configured to absorb visible light of at least one color, and to transmit or diffuse visible light of other colors, from among the visible light generated by the display panel.

3. The display apparatus of claim 1, wherein the plurality of optical functional particles have a same tint as at least one color of visible light generated by the display panel.

4. The display apparatus of claim 1, wherein the plurality of optical functional particles comprises a chromatic material of one color and/or a chromatic material of an other color.

5. The display apparatus of claim 4, wherein the chromatic material of the one color and/or the chromatic material of the other color comprises a dye material.

6. The display apparatus of claim 4, wherein the chromatic material of the one color and the chromatic material of the other color are mixed with each other.

7. The display apparatus of claim 4, wherein the chromatic material of the one color and/or the chromatic material of the other color is formed on surfaces of the plurality of optical functional particles.

8. The display apparatus of claim 4, wherein the chromatic material of the one color and/or the chromatic material of the other color is formed inside the plurality of optical functional particles.

9. The display apparatus of claim 4, wherein the chromatic material of the one color and the chromatic material of the other color have different colors selected from among red, green, and blue.

10. The display apparatus of claim 1,
    wherein the plurality of optical functional particles comprises at least first optical functional particles and second optical functional particles,
    wherein the first optical functional particles comprise a first chromatic material of a first color or a second chromatic material of a second color that is different from the first color of the first chromatic material, and
    wherein the second optical functional particles comprise a chromatic material of the first color of the first chromatic material or a chromatic material of a third color that is different from the first color of the first chromatic material.

11. The display apparatus of claim 10,
    wherein the plurality of optical functional particles further comprises third optical functional particles, and
    wherein the third optical functional particles comprise a chromatic material of the second color of the second chromatic material or a chromatic material of the third color.

12. The display apparatus of claim 11, wherein the first color of the first chromatic material, the second color of the second chromatic material, and the third color are respectively red, green, and blue.

13. The display apparatus of claim 12,
    wherein the first optical functional particles comprise a red dye material and a green dye material,
    wherein the second optical functional particles comprise a red dye material and a blue dye material, and
    wherein the third optical functional particles comprise a green dye material and a blue dye material.

14. The display apparatus of claim 1, further comprising optical functional particles that are transparent or white.

15. The display apparatus of claim 1, wherein the matrix comprises an organic material.

16. The display apparatus of claim 1, further comprising:
    a polarization layer on the optical functional layer,
    wherein the optical functional layer is between the display panel and the polarization layer, and wherein the matrix contacts the polarization layer and the display panel.

17. The display apparatus of claim 1,
wherein the display panel comprises at least one display device, and
wherein the at least one display device comprises:
   a first electrode,
   a second electrode, and
   an intermediate layer between the first electrode and the second electrode and configured to generate visible light.

18. A display apparatus for displaying an image to a user, the display apparatus comprising:
   a display panel comprising a plurality of subpixels comprising a first subpixel configured to emit light of only a first color and a second subpixel configured to emit light of only a second color different from the first color; and
   an optical functional layer arranged apart from the first subpixel and the second subpixel, the first subpixel being configured to emit the light of only the first color to the optical functional layer, and the second subpixel being configured to emit the light of only the second color to the optical functional layer, the optical function layer being configured to receive the light of only the first color and the light of only the second color, the optical functional layer comprising a matrix mixed with a plurality of optical functional particles that are colored, wherein the optical functional layer is configured to
      absorb visible light generated by at least one subpixel of the plurality of subpixels; and to
      transmit or diffuse visible light generated by another subpixel of the plurality of subpixels.

19. The display apparatus of claim 18,
wherein the plurality of subpixels further comprises:
   a third subpixel,
      wherein the first subpixel, the second subpixel and the third subpixel are configured to generate visible light of different colors:
wherein the plurality of optical functional particles of the optical functional layer comprise:
   first optical functional particles;
   second optical functional particles; and
   third optical functional particles,
wherein the first optical functional particles are configured to absorb visible light generated by the first subpixel and the second subpixel and to transmit and diffuse at least a part of visible light generated by the third subpixel,
wherein the second optical functional particles are configured to absorb visible light generated by the first subpixel and the third subpixel and to transmit and diffuse at least a part of visible light generated by the second subpixel, and
wherein the third optical functional particles are configured to absorb visible light generated by the second subpixel and the third subpixel and to transmit and diffuse at least a part of visible light generated by the first subpixel.

20. The display apparatus of claim 19,
wherein the first subpixel is configured to generate visible light having a red tint,
wherein the second subpixel is configured to generate visible light having a green tint, and
wherein the third subpixel is configured to generate visible light having a blue tint.

\* \* \* \* \*